(12) United States Patent
Srinivasan et al.

(10) Patent No.: US 7,293,152 B1
(45) Date of Patent: *Nov. 6, 2007

(54) CONSISTENT LOGICAL NAMING OF INITIATOR GROUPS

(75) Inventors: Mohan Srinivasan, Cupertino, CA (US); Herman Lee, Mountain View, CA (US)

(73) Assignee: Network Appliance, Inc., Sunnyvale, CA (US)

(*) Notice: Subject to any disclaimer, the term of this patent is extended or adjusted under 35 U.S.C. 154(b) by 560 days.

This patent is subject to a terminal disclaimer.

(21) Appl. No.: 10/421,576

(22) Filed: Apr. 23, 2003

(51) Int. Cl.
*G06F 12/06* (2006.01)

(52) U.S. Cl. ............................ 711/202; 711/4; 711/112; 711/111; 711/203; 709/217

(58) Field of Classification Search ............ None
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,897,661 A * | 4/1999 | Baranovsky et al. | 711/170 |
| 5,918,229 A * | 6/1999 | Davis et al. | 707/10 |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,065,037 A | 5/2000 | Hitz et al. | |
| 6,081,879 A * | 6/2000 | Arnott | 711/173 |
| 6,105,122 A * | 8/2000 | Muller et al. | 712/1 |
| 6,138,126 A | 10/2000 | Hitz et al. | |
| 6,148,349 A * | 11/2000 | Chow et al. | 710/33 |

(Continued)

OTHER PUBLICATIONS

David Hitz et al. TR3002 File System Design for a NFS File Server Appliance published by Network Appliance, Inc., Jul. 9, 2001.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

(Continued)

*Primary Examiner*—B. James Peikari
(74) *Attorney, Agent, or Firm*—Cesari and McKenna LLP

(57) ABSTRACT

A technique enables efficient access to logical unit numbers (luns) or virtual disks (vdisks) stored on a storage system, such as a multi-protocol storage appliance. The technique allows a grouping of initiators by a "human friendly" logical name that is mapped to a lun or vdisk on the storage appliance. The initiators are clients operating in, e.g., a storage area network (SAN) environment that initiate requests for the vdisk using block-based access protocols, such as the Small Computer Systems Interface (SCSI) protocol encapsulated over TCP/IP (iSCSI) or over fibre channel (FCP). The technique enables access to the vdisk by all initiators that are members of the initiator group (igroup). An igroup is a logical named entity that is assigned to one or more addresses associated with one or more initiators. These addresses may comprise fibre channel (FC) world wide name (WWN) or iSCSI name identifiers (IDs). Therefore, rather than having to specify these IDs when desiring access to a vdisk, an initiator need only specify the human friendly name of the igroup.

38 Claims, 8 Drawing Sheets

U.S. PATENT DOCUMENTS

| | | |
|---|---|---|
| 6,289,356 B1 | 9/2001 | Hitz et al. |
| 6,425,035 B2 | 7/2002 | Hoese et al. |
| 6,526,478 B1 * | 2/2003 | Kirby .......................... 711/114 |
| 7,055,014 B1 * | 5/2006 | Pawlowski et al. ......... 711/202 |
| 7,076,509 B1 * | 7/2006 | Chen et al. ................. 707/202 |
| 7,107,385 B2 * | 9/2006 | Rajan et al. .................... 711/4 |
| 2002/0112022 A1 | 8/2002 | Kazar et al. |
| 2002/0116593 A1 | 8/2002 | Kazar et al. |
| 2002/0156984 A1 * | 10/2002 | Padovano ................... 711/148 |
| 2004/0030668 A1 * | 2/2004 | Pawlowski et al. ............ 707/1 |
| 2004/0054776 A1 * | 3/2004 | Klotz et al. ................. 709/224 |
| 2004/0064458 A1 * | 4/2004 | Hagarty ...................... 707/100 |
| 2004/0123063 A1 * | 6/2004 | Dalal et al. ................. 711/170 |
| 2005/0228835 A1 * | 10/2005 | Roa ........................... 707/204 |
| 2006/0242179 A1 * | 10/2006 | Chen et al. ................. 707/100 |

OTHER PUBLICATIONS

Fielding et al. (1999) Request for Comments (RFC) 2616, HTTP/1.1.

Maintenance Procedures ND (BC) nd-network disk control Feb. 1985.

Misc. Reference Manual Pages ND (4P) nd-network disk driver Jul. 26, 1985.

Asante EN/SC Adapter Family Installation Guide May 1994.

Asante Desktop EN/SC Adapters User's Manual Apr. 1996.

Performance Without Compromise: The Virtual Storage Architecture 1997.

Anthony J. McGregor Department of Computer Science, University of Waikato Dissertation: Block-Based Distributed File Systems Jul. 1997.

* cited by examiner

CONSISTENT LOGICAL NAMING OF INITIATOR GROUPS

FIELD OF THE INVENTION

The present invention relates to network storage systems and, more particularly, to accessing information stored on networked storage systems.

BACKGROUND OF THE INVENTION

A storage system is a computer that provides storage service relating to the organization of information on writable persistent storage devices, such as memories, tapes or disks. The storage system may be deployed within a storage area network (SAN) or a network attached storage (NAS) environment. When used within a NAS environment, the storage system may be embodied as a file server including an operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In general, NAS systems utilize file-based protocols to access data stored on the filer. Each NAS client may therefore request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system, such as an application server, and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media (i.e., network) adapted to operate with block access protocols, such as Small Computer Systems Interface (SCSI) protocol encapsulation over FC (FCP) or TCP/IP/ Ethernet (iSCSI).

SCSI is a peripheral input/output (I/O) interface with a standard, device independent protocol that allows different peripheral storage devices, such as disks, to attach to the is storage system. These storage devices may be locally attached to the storage system or, in the case of a SAN environment, attached via a network. In SCSI terminology, clients operating in a SAN environment are initiators that initiate requests and commands for data stored on the storage devices. The storage system is a target configured to respond to the requests issued by the initiators in accordance with a request/response protocol. The SAN clients typically identify and address the stored information in the form of blocks or disks by logical unit numbers ("luns").

In SCSI addressing, each initiator has a world wide name (WWN) or iSCSI name that is used by the initiator to access a lun entity, such as a disk, on the storage system. For example, each system on a FC SAN has a WWN, which is a 64-bit location independent identifier (ID) that is written in hexadecimal notation; iSCSI names are analogous to WWNs, but with a different format. The iSCSI names are used with the iSCSI protocol as IDs when restricting block-level access to a lun by one or more initiators. Thus, each time an initiator desires access to a lun, the WWN ID or iSCSI name must be provided to the storage system by a client/user of the initiator. This is an inefficient and possibly error-prone approach to accessing luns on a SAN storage system.

SUMMARY OF THE INVENTION

The present invention overcomes the disadvantages of the prior art by providing a technique that enables efficient access to logical unit numbers (luns) or virtual disks (vdisks) stored on a storage system, such as a multi-protocol storage appliance. The technique allows a grouping of initiators by a "human friendly" logical name that is mapped to a lun or vdisk on the storage appliance. By "human friendly" it is meant, generally, a hierarchical naming convention that may use a spoken language name including an arbitrary label selected by a user or administrator. The initiators are clients operating in, e.g., a storage area network (SAN) environment that initiate requests for the vdisk using block-based access protocols, such as the Small Computer Systems Interface (SCSI) protocol encapsulated over TCP/IP (iSCSI) or over fibre channel (FCP). The inventive technique enables access to the vdisk by all initiators that are members of the initiator group (igroup). An igroup is a logical named entity that is assigned to one or more addresses associated with one or more initiators. These addresses may comprise fibre channel (FC) world wide name (WWN) or iSCSI name identifiers (IDs). Therefore, rather than having to specify these IDs when desiring access to a vdisk, an initiator need only specify the human friendly name of the igroup.

According to the invention, the technique includes a method of creating logical igroups of initiators, each identified by a human-friendly name or label, and binding of each created igroup to one or more WWN or iSCSI IDs. An igroup may contain one initiator (in the case of a simple initiator-to-initiator group binding) or more initiators (in the case of a SAN cluster or a single client with multiple initiators for redundancy and/or multipathing purposes). In addition, the technique includes a method of assigning a lun ID to a vdisk and specifying the igroup of initiators that are allowed access to the vdisk, i.e., the clients to which the vdisk is exported. In other words, the igroup name is used to map a vdisk to all member initiators of the igroup. An initiator can be part of more than one igroup and inherit the vdisk (lun) mapping from all the groups.

An igroup has certain attributes, such as transport protocol type and operating system type of the member initiators. Illustratively, the igroup need not be homogeneous in terms of these attributes, i.e., an igroup can contain initiators having different combinations of FCP and/or iSCSI as a transport. For example, iSCSI and FCP initiators can be combined into a single igroup. In addition, igroup can support various operating system initiator members. This allows operations, such as graceful rolling upgrade of a FCP SAN cluster to an iSCSI cluster, with no application downtime. Moreover, membership of the igroups can be modified at any time, i.e., initiators can be added to or removed from an igroup and, as a consequence, inherit or lose the mappings of the igroup, respectively.

Advantageously, the inventive technique obviates the need to use a WWN or iSCSI name ID during operation of the multi-protocol storage appliance except in a command used to bind the ID to an igroup. All other operations and commands invoked via, e.g., a user interface use only the igroup. This is a powerful and consistent abstraction with fundamental implications on global updates, e.g., when replacing an initiator in a client and the need to globally replace a WWN or iSCSI name, and in achieving goals of simplicity to create the multi-protocol storage appliance.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN
ILLUSTRATIVE EMBODIMENT

Figure 1:
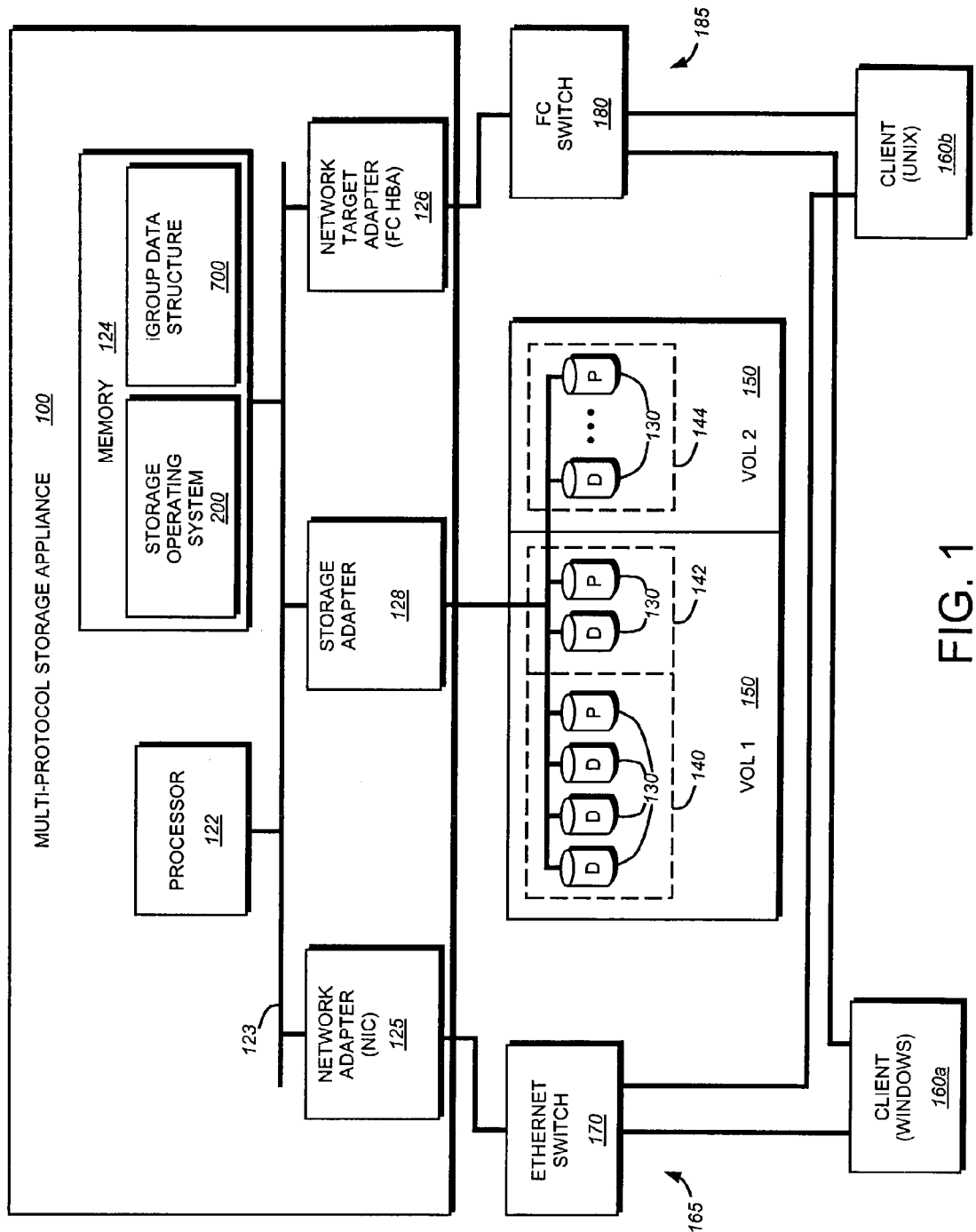
FIG. 1 is a schematic block diagram of a multi-protocol storage appliance that may be advantageously used with the present invention.

FIG. 1 is a schematic block diagram of a multi-protocol storage appliance 100 that may be advantageously used with the present invention. The multi-protocol storage appliance is configured to provide storage service for both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage is (NAS) and storage area network (SAN) deployments.

The multi-protocol storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130. An example of a multi-protocol storage appliance that may be advantageously used with the present invention is described in co-pending and commonly assigned U.S. patent application Ser. No. 10/215,917 titled A Multi-Protocol Storage Appliance that Provides Integrated Support for File and Block Access Protocols, which application is hereby incorporated by reference as though fully set forth herein.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. For this NAS-based network environment, the clients are configured to access information stored on the multi-protocol appliance as files. Therefore, the network adapter 125 may comprise a network interface card (NIC) having the mechanical, electrical and signaling circuitry needed to connect the appliance to a network switch, such as a conventional Ethernet switch 170. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the Solaris™/ Unix® and Microsoft Windows® operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the Solaris operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA offloads fiber channel network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

To facilitate access to the disks 130, the storage operating system 200 implements a write-anywhere file system that cooperates with virtualization modules to provide a function that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as Solaris or Windows, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
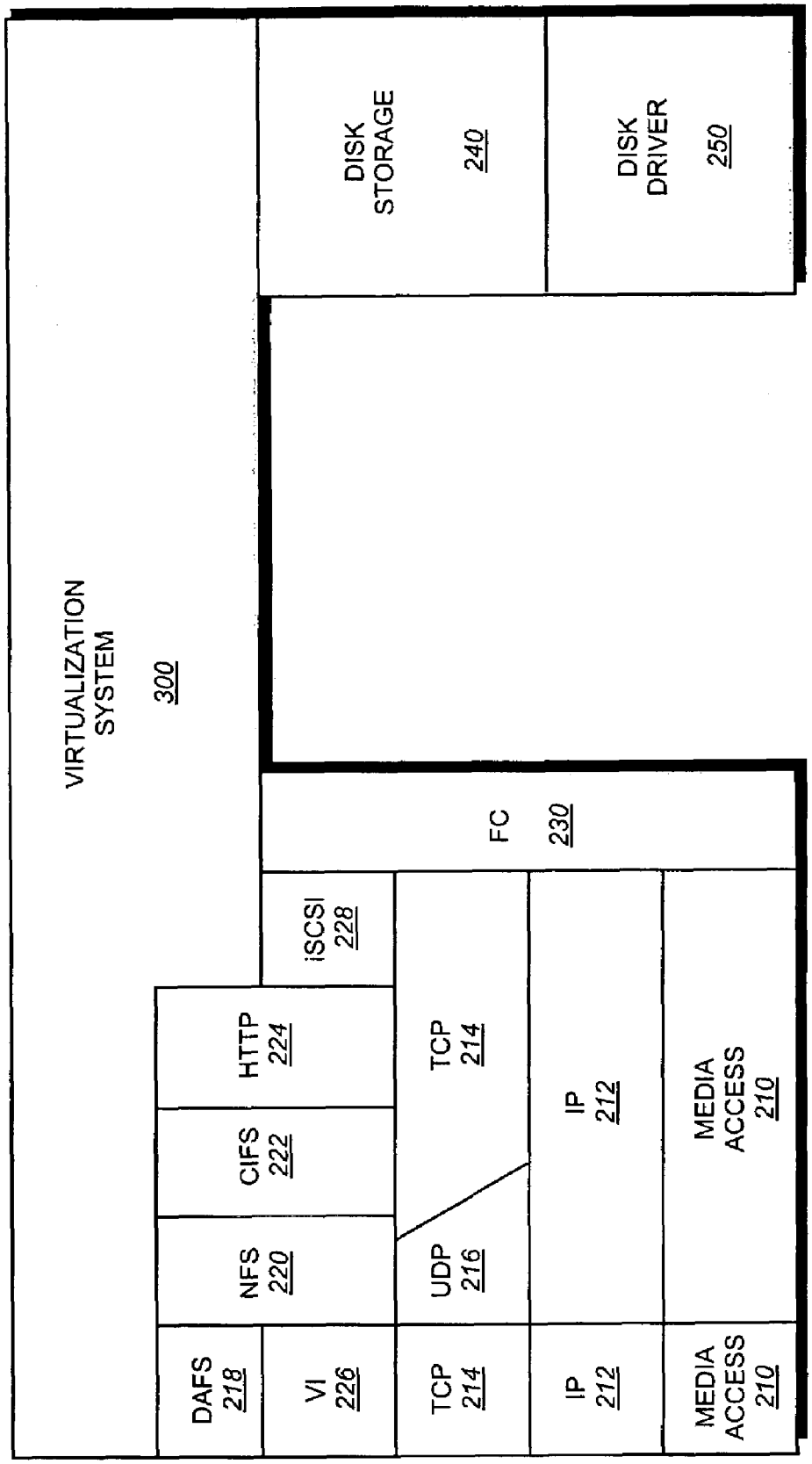
FIG. 2 is a schematic block diagram of a storage operating system of the multiprotocol storage appliance that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Figure 3:
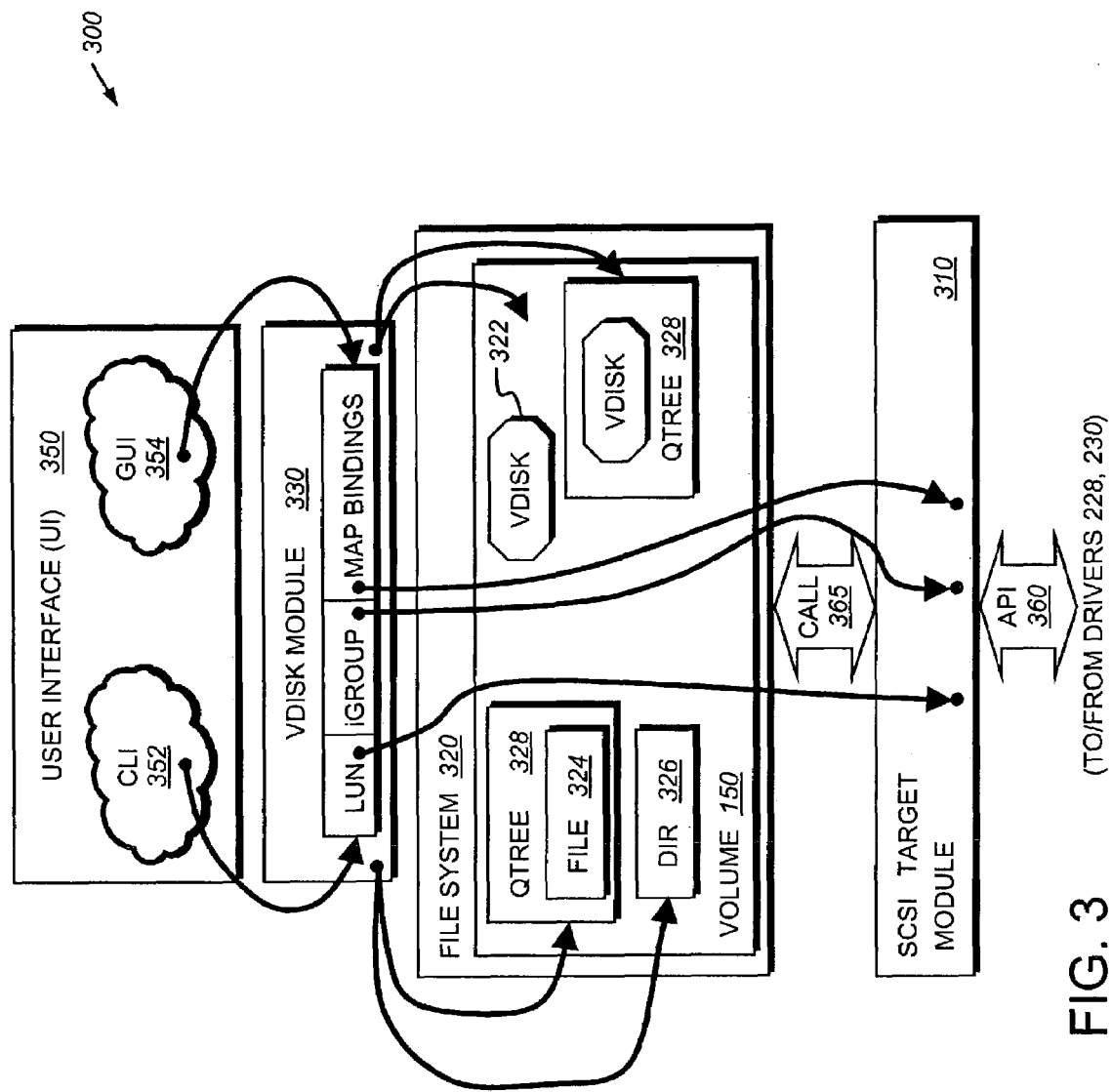
FIG. 3 is a schematic block diagram of a virtualization system that is implemented by a file system interacting with virtualization modules of the storage operating system.

Bridging the disk software layers with the integrated network protocol stack layers is a virtualization system 300. FIG. 3 is a schematic block diagram of the virtualization system 300 that is implemented by a file system 320 interacting with virtualization modules illustratively embodied as, e.g., vdisk module 330 and SCSI target module 310. It should be noted that the vdisk module 330, the file system 320 and SCSI target module 310 can be implemented in software, hardware, firmware, or a combination thereof. The vdisk module 330 is layered on the file system 320 to enable access by administrative interfaces, such as a streamlined user interface (UI 350), in response to a system administrator issuing commands to the multi-protocol storage appliance 100. In essence, the vdisk module 330 manages SAN deployments by, among other things, implementing a comprehensive set of vdisk (lun) commands issued through the UI 350, e.g., a command line interface (CLI 352) or a graphical user interface (GUI 354), by a system administrator. These vdisk commands are converted to primitive file system operations ("primitives") that interact with the file system 320 and the SCSI target module 310 to implement the vdisks.

The SCSI target module 310, in turn, initiates emulation of a disk or lun by providing a mapping procedure that translates luns into the special vdisk file types. The SCSI target module is illustratively disposed between the FC and iSCSI drivers 228, 230 and the file system 320 to thereby provide a translation layer of the virtualization system 300 between the SAN block (lun) space and the file system space, where luns are represented as vdisks 322. To that end, the SCSI target module has a set of application programming interfaces (APIs 360) that are based on the SCSI protocol and that enable a consistent interface to both the iSCSI and FCP drivers 228, 230. By "disposing" SAN virtualization over the file system 320, the multi-protocol storage appliance reverses the approaches taken by prior systems to thereby provide a single unified storage platform for essentially all storage access protocols.

The file system 320 is illustratively a message-based system; as such, the SCSI target module 310 transposes a SCSI request into one or more messages representing an operation(s) directed to the file system. For example, a message generated by the SCSI target module may include a type of operation (e.g., read, write) along with a pathname (e.g., a path descriptor) and a filename (e.g., a special filename) of the vdisk object represented in the file system. Alternatively, the generated message may include an operation type and file handle containing volume/inode information. The SCSI target module 310 passes the message into the file system layer 320 as, e.g., a function call 365, where the operation is performed.

The file system provides volume management capabilities for use in block-based access to the information, such as vdisks, stored on the storage devices, such as disks. That is, in addition to providing file system semantics, such as naming of storage objects, the file system 320 provides functions normally associated with a volume manager. These functions include (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance is the simplicity of use associated with these volume management capabilities, particularly when used in SAN deployments.

The file system 320 illustratively implements the WAFL file system having an on-disk format representation that is block-based using, e.g., 4 kilobyte (kB) blocks and using inodes to describe the files 324. The WAFL file system uses files to store metadata describing the layout of its file system; these metadata files include, among others, an inode file. A file handle, i.e., an identifier that includes an inode number, is used to retrieve an inode from disk. A description of the structure of the file system, including ondisk inodes and the inode file, is provided in U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

Figure 4:
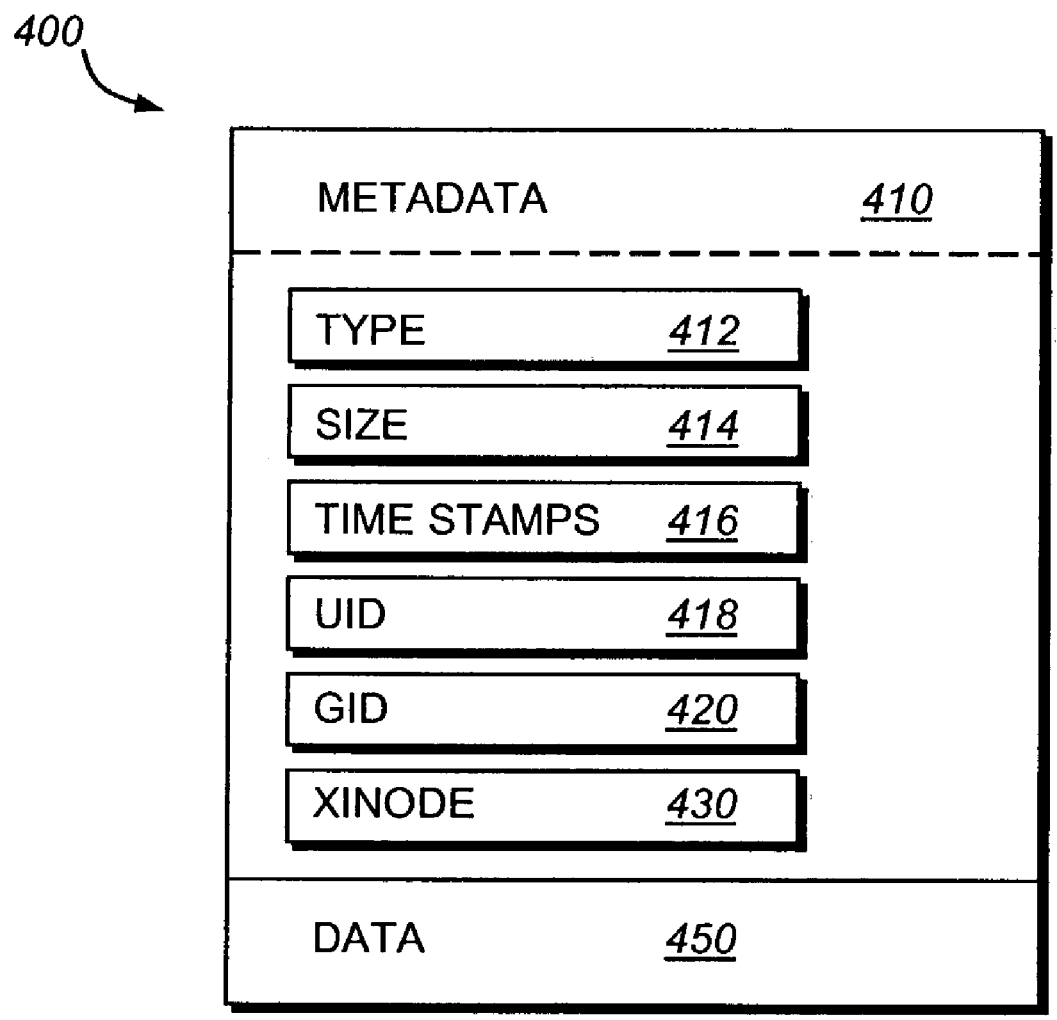
FIG. 4 is a schematic block diagram of an on-disk inode data structure that may be advantageously used with the present invention.

FIG. 4 is a schematic block diagram illustrating an on-disk inode 400, which includes a metadata section 410 and a data section 450. The information stored in the metadata section 410 of each inode 400 describes the file and, as such, includes the type (e.g., regular or directory) 412 of file, the size 414 of the file, time stamps (e.g., access and/or modification) 416 for the file and ownership, i.e., user identifier (UID 418) and group 1D (GID 420), of the file. The metadata section 410 further includes a xinode field 430 containing a pointer that references another on-disk inode structure containing, e.g., access control list (ACL) information associated with the file or directory. The contents of the data section 450 of each inode, however, may be interpreted differently depending upon the type of file (inode) defined within the type field 412. For example, the data section 450 of a directory inode contains metadata controlled by the file system, whereas the data section of a regular inode contains user-defined data. In this latter case, the data section 450 includes a representation of the data associated with the file.

Specifically, the data section 450 of a regular on-disk inode may include user data or pointers, the latter referencing 4 kB data blocks on disk used to store the user data. Each pointer is preferably a logical volume block number to thereby facilitate efficiency among the file system and the disk storage (RAID) layer 240 when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kB, then the data section of the inode comprises up to 16 pointers, each of which references a 4 kB block of data on the disk. Moreover, if the size of the data is greater than 64 kilobytes but less than or equal to 64 megabytes (MB), then each pointer in the data section 450 of the inode references an indirect inode that contains 1024 pointers, each of which references a 4 kB data block on disk. Each data block is loaded from disk 130 into memory 124 in order to access the data. In addition, the size field 414 of the metadata section 410 of the inode refers to the size of the file.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

Referring again to FIG. 3, the file system implements access operations to vdisks 322, as well as to files 324 and directories (dir 326) that coexist with respect to global space management of units of storage, such as volumes 150 and/or qtrees 328. A qtree 328 is a special directory that has the properties of a logical sub-volume within the namespace of a physical volume. Each file system storage object (file, directory or vdisk) is illustratively associated with one qtree, and quotas, security properties and other items can be assigned on a per-qtree basis. The vdisks and files/directories may be layered on top of qtrees 328 that, in turn, are layered on top of volumes 150 as abstracted by the file system "virtualization" layer 320.

Note that the vdisk storage objects in the file system 320 are generally associated with SAN deployments of the multi-protocol storage appliance, whereas the file and directory storage objects are associated with NAS deployments of the appliance. The files and directories are generally not accessible via the FC or SCSI block access protocols; however, a file can be converted to a vdisk and then accessed by either the SAN or NAS protocol. The vdisks are thus accessible as luns from the SAN (FC and SCSI) protocols.

According to the invention, the UI 350 (CLI 352 and/or GUI 354) interacts with the vdisk module 330 to introduce attributes and persistent lun map bindings that assign numbers to a created vdisk. These lun map bindings are thereafter used to export vdisks as certain SCSI identifiers (IDs) to the clients. In particular, the created vdisk can be exported via a lun mapping technique to enable a SAN client to "view" (access) a disk. Vdisks (luns) generally require strict controlled access in a SAN environment; sharing of luns in a SAN environment typically occurs only in limited circumstances, such as clustered file systems, clustered operating systems and multi-pathing configurations. A system administrator of the multi-protocol storage appliance determines which vdisks (luns) can be exported to a SAN client. Once a vdisk is exported as a lun, the client may access the vdisk over the SAN network utilizing a block access protocol, such as FCP and iSCSI.

SAN clients typically identify and address disks by logical numbers or luns. However, an "ease of management" feature of the multi-protocol storage appliance is that system administrators can manage vdisks and their addressing by logical names. To that end, the CLI 352 and/or GUI 354 interact with the vdisk module 330 and SCSI target module 310 to map logical names to vdisks. The present invention relates to a technique that allows a grouping of initiators by a "human friendly" logical name that is mapped to a lun or vdisk stored on the multi-protocol storage appliance to thereby enable access to the vdisk by all initiators that are members of the initiator group (igroup). As used herein, a "human friendly" logical name is an arbitrary label selected by the user of administrator that may be a spoken name, a path designation or include a hierarchical naming convention. An exemplary human friendly name would be "administrators" for a name of an igroup that comprises the administrators of a given network.

An igroup is a logical named entity that is assigned to one or more addresses, e.g., WWN or iSCSI name identifiers (IDs), associated with one or more initiators (depending upon whether a clustered environment is configured). The multi-protocol storage appliance manages export control of vdisks by logical names through the use of igroups. As described herein, an "igroup create" command essentially "binds" (associates) those addresses to a logical name or igroup. Therefore, rather than having to specify these IDs when desiring access to a vdisk, an initiator need only specify the human friendly name of the igroup.

As noted, a vdisk is a special file type in a volume that derives from a plain (regular) file, but that has associated export controls and operation restrictions that support emulation of a disk. Illustratively, the vdisk is a multi-inode object comprising a special file inode and a plurality of associated streaminodes, including an attributes stream inode and a lunmap streaminode. The special file (lun) inode functions as a data container for storing data, such as application data, associated with the emulated disk. The lunmap inode contains a list of igroups to which the vdisk is exported, along with one or more addresses associated with one or more initiators that are assigned to each igroup.

Figure 5:
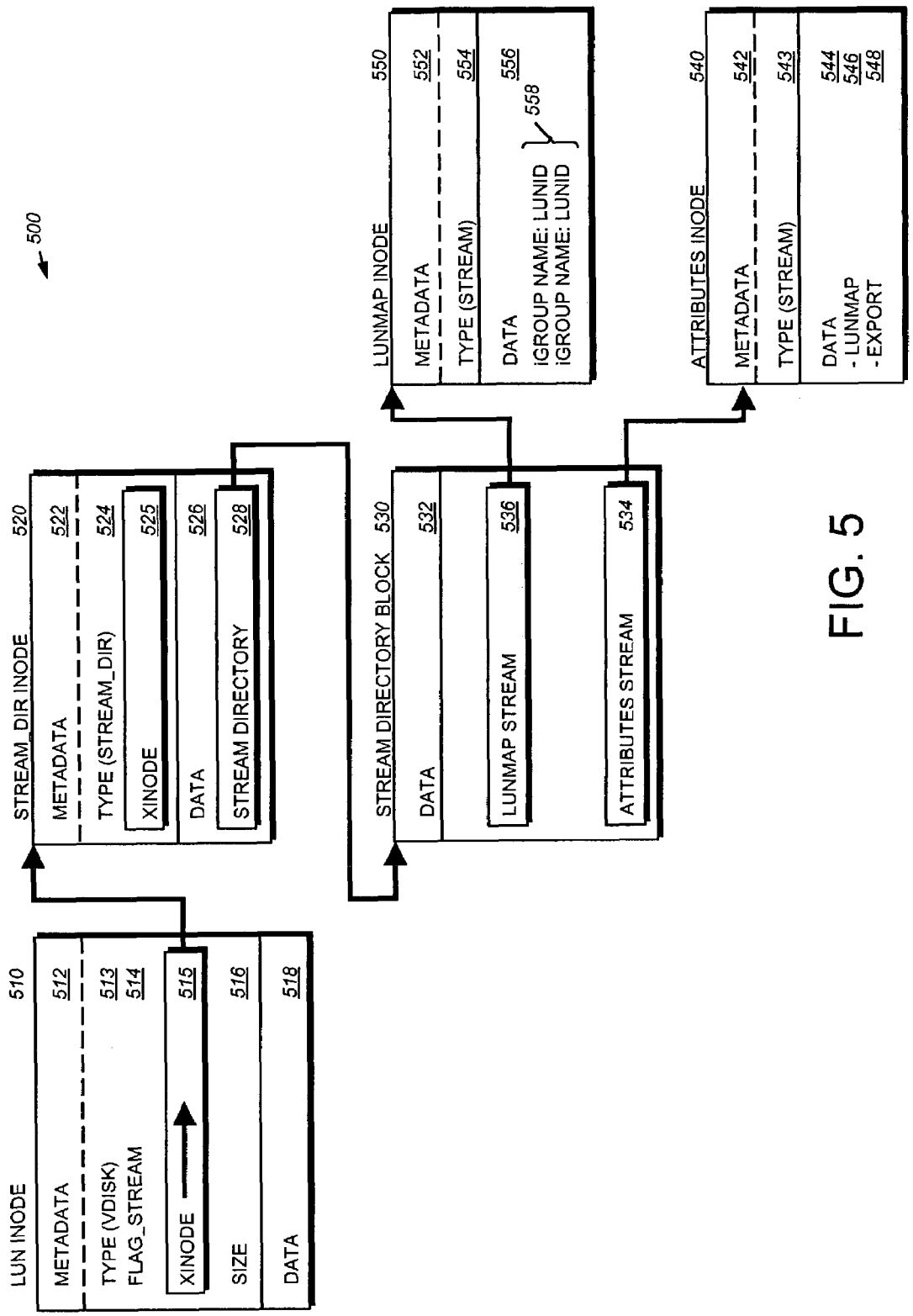
FIG. 5 is a schematic block diagram illustrating an on-disk representation of virtual disk (vdisk) inode data structures, including logical unit number (lun) and lunmap inodes, in accordance with the present invention.

FIG. 5 is a schematic block diagram illustrating an on-disk representation of vdisk inode data structures 500, including a lun inode 510, an attributes inode 540 and a lunmap inode 550. As noted, the lun inode 510 is the special file inode that functions as a data container for storing application data associated with the vdisk 322. That is, the lun inode comprises a data section 518 that may store the actual application data or pointers referencing 4 kB data blocks on disk used to store the data, as described in FIG. 4. The data stored in this "default" data container can be retrieved (read) and stored (written) by a client using conventional block access protocols, such as the SCSI protocol. When appropriately configured, a vdisk may also be accessed using conventional file-level access protocols, such as the NFS protocol. In this configuration, a vdisk "appears" to be a regular file for such accesses. The lun inode 510 also comprises a metadata section 512 containing metadata such as the type 513 (i.e., a special vdisk type) and size 516 of the vdisk that, upon creation of the inode, is zero. A flag_stream flag 514 identifies the lun inode 510 as having one or more stream "sections", as provided by stream_dir inode 520.

In order to access the stream_dir inode 520, the pointer of xinode field 515 in lun inode 510 is modified to reference the inode 520. The stream_dir inode 520 comprises a metadata section 522 that includes a type (stream_dir) field 524 and an xinode field 525 that references another on-disk inode structure containing, e.g., access control (such as CIFS permission) information associated with the vdisk. The inode 520 also includes a data section 526 containing a pointer 528 that references a stream directory data block associated with the vdisk, such as stream directory block 530. The stream directory block 530 comprises a data section 532 that includes a plurality of entries, each containing an external representation of a streaminode along with mapping information (i.e., the inode number) for that inode. Two of those entries, entries 534 and 536, contain mapping information (e.g., pointers) that reference an attributes (stream) inode 540 and a lunmap (stream) inode 550, respectively.

The attributes inode 540 comprises a metadata section 542 that includes a type (stream) field 543 and a data section 544 that functions as a persistent store for holding various named attributes associated with the vdisk 322. Attributes are an implementation mechanism that is internal to the file system and not managed by users. Examples of attributes include a lun map 546 and export information 548 controlling access to the vdisk by, e.g., specifying a list of initiators to which the vdisk is exported (i.e., those that have permissions to access to the vdisk). The lunmap inode 550 comprises a metadata section 552 that includes a type (stream) field 554 and a data section 556 that functions as a persistent store for holding a list 558 of name-value pairs. The name is illustratively an igroup name and the value is a lun identifier (ID). The vdisk and its associated inode data structures, including the attributes and lunmap inodes, are further described in co-pending and commonly assigned U.S. patent application Ser. No. 10/216,453 titled Storage Virtualization by Layering Vdisks on a File System, which application is hereby incorporated by reference as though fully set forth herein.

In the illustrative embodiment, vdisks (luns) are "layered" on top of igroups. The igroup abstracts the underlying details of "naming" (i.e., identification) of clients or initiators that desire access to the vdisks. The naming details (for purposes of allowing access to a vdisk/lun by a client/initiator) may be completely different between block access protocols, such as FCP and iSCSI. However, the logical naming of igroups is consistent with the FC and SCSI standards; the novel technique represents an application of those standards that simplifies access to the vdisks. The igroup abstraction thus decouples implementation of addressing from the underlying details of addressing. In other words, an igroup allows a user to define client or related clients addressing by logical names that are then used by higher layer vdisk (lun) commands to allow access. As a result, a vdisk (lun) can be easily shared over iSCSI and FCP, thereby allowing use in applications such as a mixed iSCSI or FCP cluster. Moreover, reorganization or upgrades of client/initiators do not affect security assignments (allowing access) at the lun level, since they are indirect via the logical igroup name.

Figure 6:
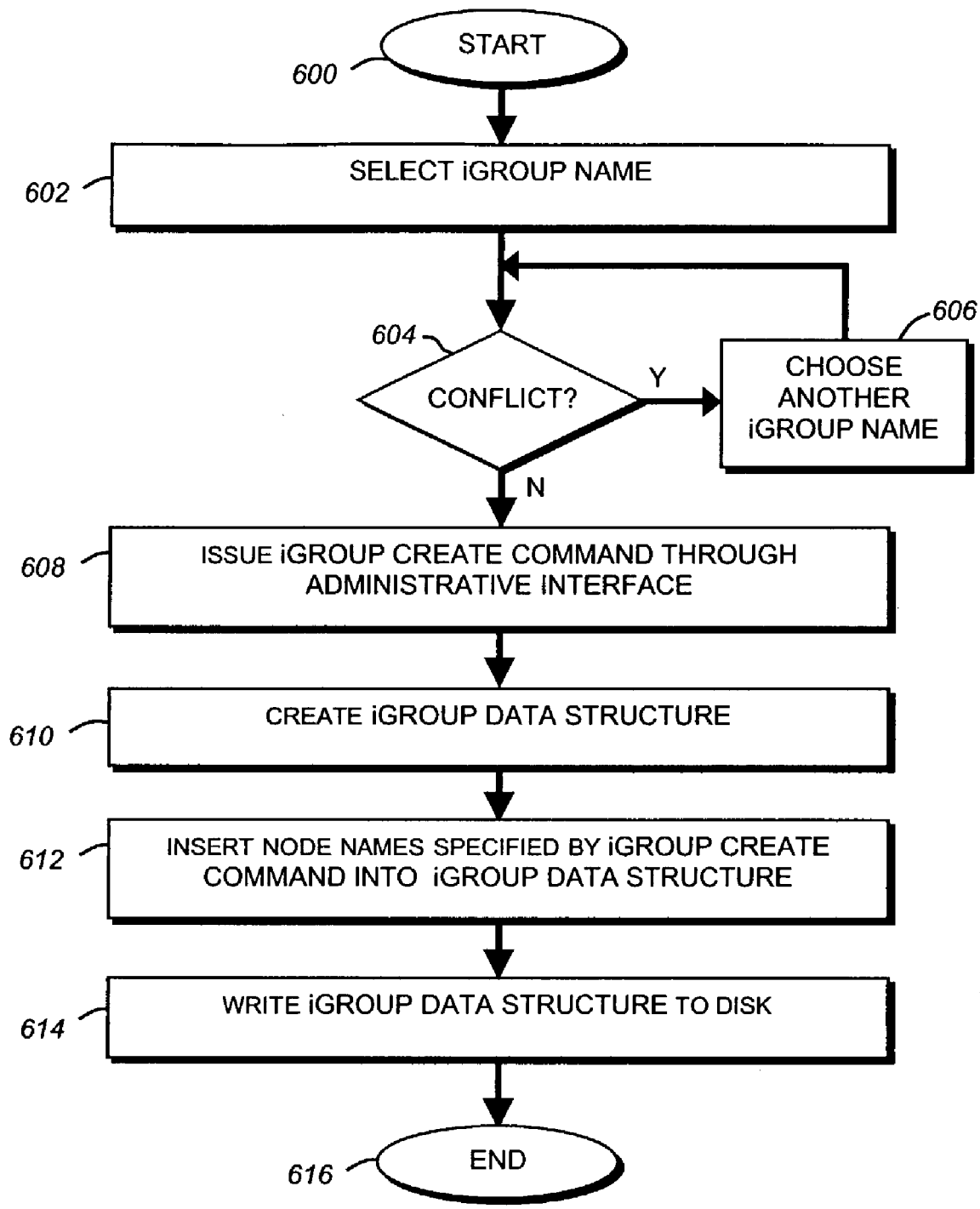
FIG. 6 is a flowchart illustrating a sequence of steps used to create an initiator group (igroup) in accordance with the present invention.

According to the invention, the novel technique includes a method of creating logical igroups of initiators, each identified by a human-friendly name or label, and binding of each created igroup to one or more initiator addresses (e.g., WWN or iSCSI IDs). FIG. 6 is a flowchart illustrating a sequence of steps used to create an igroup in accordance with the present invention. The sequence starts at Step 600 and proceeds to Step 602 where a user (system administrator) selects a human-friendly name for the igroup. In Step 604, a determination is made as to whether there is "clash" (conflict) between that selected name and an existing igroup name. If so, another igroup name is chosen in Step 606 and the sequence returns to Step 602 until there is no conflict.

In Step 608, the user creates an igroup by issuing an "igroup create" command through, e.g., CLI 352, GUI 354 or similar administrative interfaces associated with the multi-protocol storage appliance. An example of the igroup create command is:

igroup create-f<groupname> <nodename(s)> wherein the <groupname> parameter indicates the human-friendly name of the igroup and the <nodename(s)> parameter indicates the initiator(s), e.g., the WWN or iSCSI address ID(s), bound to the igroup. An igroup may contain one initiator (in the case of a simple initiator-to-initiator group binding) or more initiators (in the case of a SAN cluster or a single client with multiple initiators for redundancy and/or multipathing purposes). The created igroup create thus enables grouping of initiators by a human friendly logical name.

In response to the igroup create command, the file system 320 cooperates with the vdisk module 330 to create an "in-core" igroup data structure 700 (e.g., a table in memory 124) in Step 610. In Step 612, the vdisk module 330 processes the igroup create command to "call" primitive operations ("primitives") in the file system 320 to insert the name and addresses specified by the create command into the igroup data structure 700. This step of the sequence essentially binds the logical, human-friendly name to one or more WWN or iSCSI IDs. Thereafter, in Step 614, the igroup data structure is written (stored) to the disk 130. The sequence then ends at Step 616.

Figure 7:
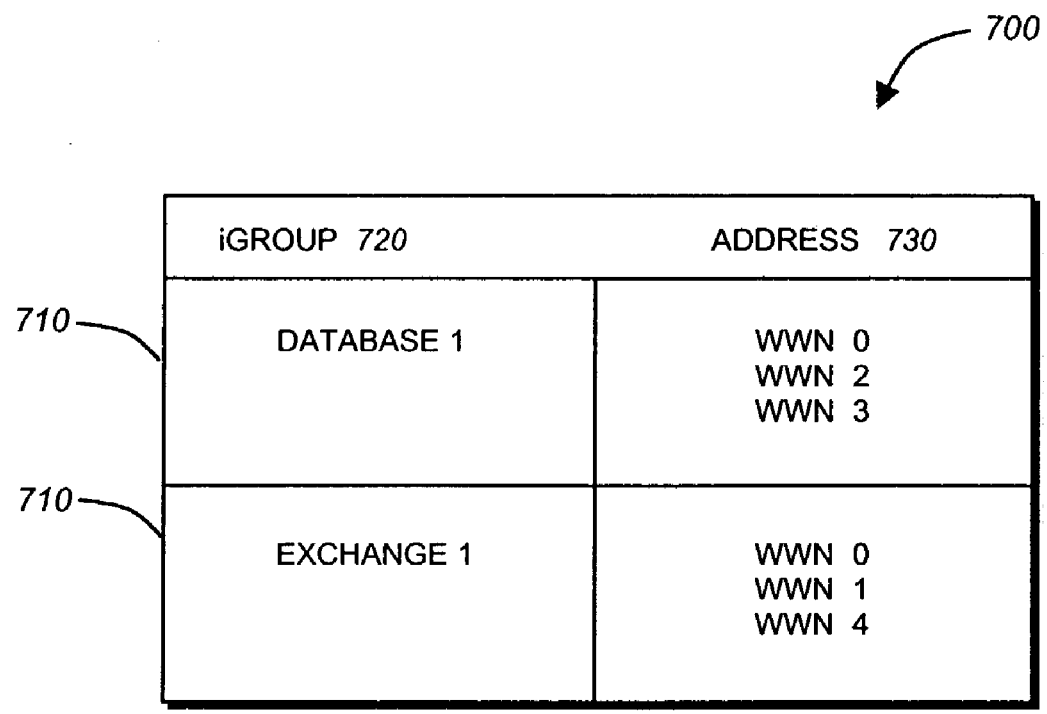
FIG. 7 is a schematic diagram of an igroup data structure having igroup definition entries in accordance with the present invention.

FIG. 7 is a schematic representation of the igroup data structure 700 having a plurality of igroup definition entries 710 that may be advantageously used with the present invention. Each definition 710 includes an igroup field 720 that identifies a particular human friendly igroup name and an address field 730 that identifies one or more addresses (e.g., WWN addresses or iSCSI IDs) associated with one or more initiators assigned to the igroup. For example, igroup "database 1" is assigned a plurality of WWN 64-bit hexadecimal values 0, 2, 3, each of which associates a particular initiator member to that igroup. Similarly, igroup "exchange 1" is assigned WWN values 0, 1, 4, each associating an initiator member to that igroup.

Figure 8:
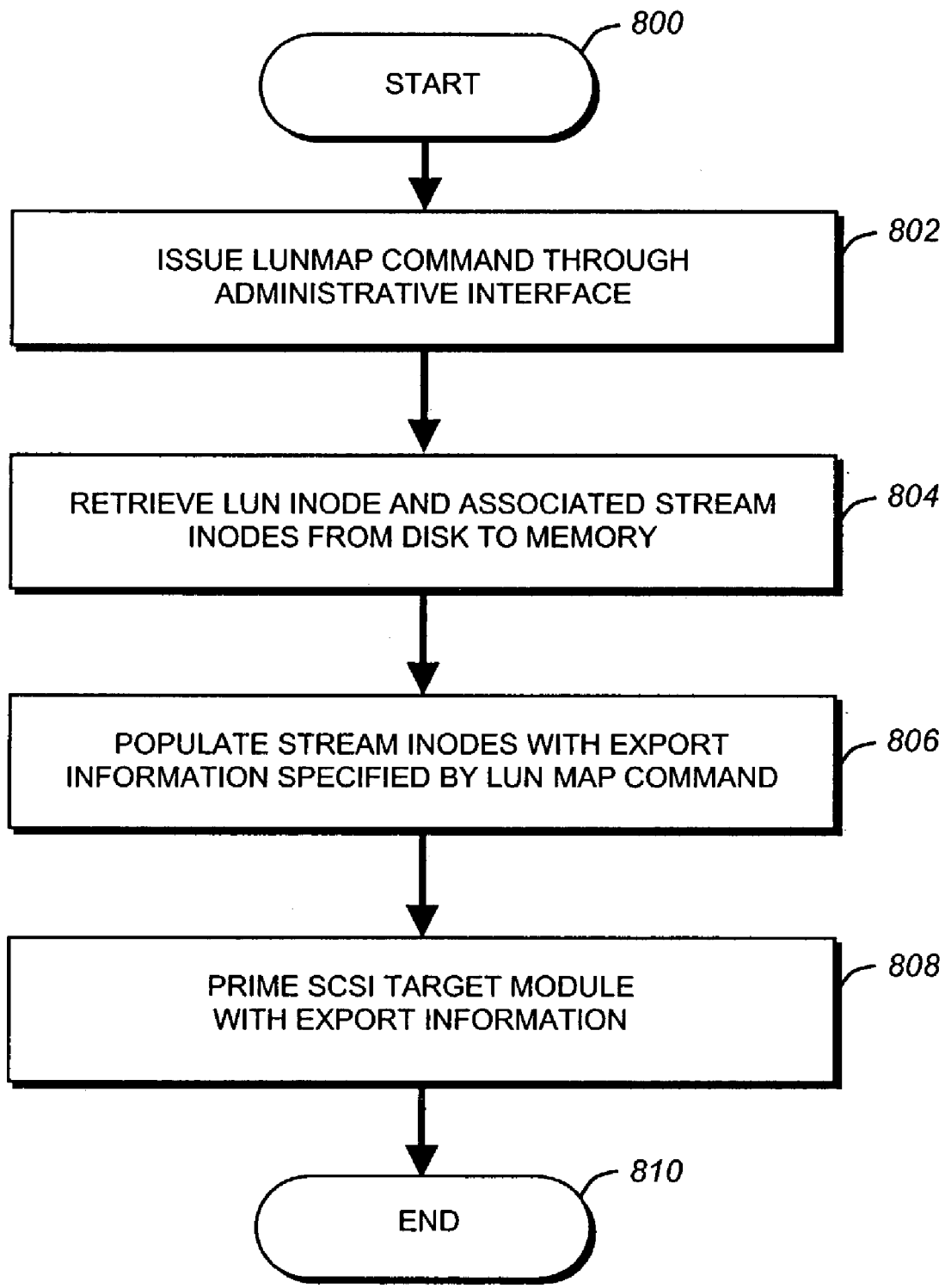
FIG. 8 is a flowchart illustrating a sequence of steps used to map a lun to an igroup in accordance with the present invention.

The novel technique also includes a method of assigning a lun ID to a vdisk and specifying the igroup of initiators that are allowed access to the vdisk, i.e., the clients to which the vdisk is exported. In other words, this aspect of the inventive technique involves mapping a vdisk (lun) to an igroup. FIG. 8 is a flowchart illustrating a sequence of steps used to map a lun to an igroup in accordance with the present invention. The sequence starts at Step 800 and proceeds to Step 802 where a user maps a lun to an igroup by issuing a "lun map" command through the CLI 352, GUI 354 or similar administrative interfaces associated with the multi-protocol storage appliance. An example of the lun map command is:

lun map <path> <groupname> <lunID> wherein the <path> parameter is a path descriptor containing volume/inode information and a file handle to a vdisk, the <groupname> parameter indicates the human friendly name of the igroup and the <lunID> parameter indicates the lun ID assigned to the vdisk. Note that the lun ID is unique within the client's (initiator's) lun space. In Step 804, the vdisk module 330 processes the lun map command to call primitives in the file system 320 to retrieve a lun inode and its associated streaminodes of the vdisk from disk, which are then loaded into memory (in-core). In Step 806, primitives are called to populate the attributes inode 540 and lunmap inode 550 of the vdisk with the export information, including igroup and lun ID, specified by the lun map command. In Step 808, the SCSI target module 310 is "primed" with the export information to enable access by the initiators of the igroup to the specified vdisk. The sequence then ends at Step 810.

The igroup create and lun map commands essentially provide a mapping function between one or more initiators of an igroup and a lun ID that is representative of a vdisk. An initiator can be a member of more than one igroup and inherit the vdisk (lun) mapping from all the groups. The SCSI target module 310 thereafter implements the mapping function to allow a particular lun or vdisk to be exported to (accessed by) all initiators of a particular igroup. The mapping function is illustratively embodied as igroup definitions stored in the igroup data structure 700 and export information stored in the stream (lunmap and attributes) inodes. To that end, the SCSI target module is primed with export information, as indicated in Step 808, by processing the contents of the igroup data structure and streaminodes.

Specifically, the lunmap streaminode 550 associated with each vdisk specifies the availability (visibility) of the vdisk to one or more igroups with respect to a lun ID. Since the igroups are identified by names associated with lun IDs within the lunmap inode, references are made to the igroup definitions 710 stored in the igroup data structure 700 in order to resolve each igroup name with a WWN address or iSCSI ID. The lun ID identified within the value portion of the name-value pair indicates the assigned lun number to the vdisk in accordance with a persistent lunmap "binding" that enables a SAN client to "view" (access) a vdisk.

According to the invention, the lun map command may be used to export one or more vdisks to the igroup, i.e., make the vdisk(s) "visible" to the igroup. In this sense, the lun map command is equivalent to an NFS export or a CIFS share. The WWN addresses or iSCSI IDs thus identify the igroups/ clients that are allowed to access those vdisks specified by the lun map command. Thereafter, the logical igroup names are used with all operations internal to the storage operating system. This logical naming abstraction is pervasive throughout the entire vdisk command set, including interactions between a user and the multi-protocol storage appliance. In particular, the igroup naming convention is used for all subsequent export operations and listings of luns that are exported for various SAN clients.

Each igroup has certain associated attributes, such as transport protocol type and operating system type of its member initiators (node names). For example, the initiators within an igroup illustratively support the FCP, iSCSI and ATA transport protocol type. The operating system type attribute refers to the operating system type of the member initiators in the igroup. This latter attribute is provided because a SCSI target (such as the multiprotocol storage appliance) often "behaves" differently when interacting with different operating systems (e.g., Solaris, Windows, and Linux) of the initiators. Processing of a request received at the storage appliance occurs at lower layers of the storage operating system. Since addresses (WWN or iSCSI IDs) are bound to igroup name, these lower layers "know" whether the request is received over, e.g., an iSCSI or FCP transport.

In the illustrative embodiment of the present invention, the igroup need not be homogeneous in terms of these attributes, i.e., an igroup can contain initiators having different combinations of FCP, iSCSI and ATA as a transport. For example, iSCSI, FCP and ATA initiators may be combined into a single igroup. In addition, an igroup can support various operating system initiator members. This allows operations, such as graceful rolling upgrade of a FC SAN cluster to an iSCSI cluster, with no application downtime. In addition, membership of the igroups can be modified at any time, i.e., initiators can be added to or removed from an igroup and, as a consequence, inherit or lose the mappings of the igroup, respectively.

Use of the initiator group abstraction is particular advantageous in a situation where a particular initiator (client) may access more than one disk (vdisk) of the multiprotocol storage appliance for various applications. In that case, the user issues, in the following order, a lun create command through the UI that creates, e.g., twenty 100g vdisks called "vdisks1-20". The user then issues the igroup create command that binds a WWN of the client (initiator) to a logical name, e.g., "FCPClient". The WWN represents the address of a host bus adapter (HBA) module on the client and is thus assigned on a per module basis. The user then issues the lun map command that binds the vdisks1-20 to the logical igroup name FCPClient.

Assume now that the HBA module in the client fails and a new adapter is installed in the client that has an address that is different from the address associated with the igroup FCPClient. Accordingly, the client can no longer access the vdisks1-20 because those disks are exported to a WWN address that is different from the new address of the client. To rectify this situation, a user need merely issue "igroup delete" and "igroup add" commands through the UI 350 of the multi-protocol storage appliance to reflect the new client HBA address. That change then "ripples" throughout the vdisk command set to reflect the new association of the igroup name to all of the vdisks1-20. This feature of the novel multi-protocol storage appliance architecture reflects global, single point changes to an igroup address for all the disks associated with that igroup.

In sum, the novel igroup technique decouples addressing from the actual protocol to thereby enable multi-protocol access to luns via either iSCSI or FCP, each of which has a different addressing scheme. Naming (e.g., hierarchical naming) simplifies management by hiding details of underlying addressing schemes of the transport. The igroup thus comprises a multi-protocol encapsulation of host access control and address information making the vdisk transport protocol independent. That is, the vdisk can be simultaneously accessed by FCP, iSCSI or similar transports, such as ATA and serial ATA, with an abstract human friendly name hiding any addressing details. This feature provides high-level configuration information in the appliance the ability to handle any type of lower-level addressing. Therefore, igroup logical naming comprises (i) a pure naming and simplification arrangement, as well as (ii) an application thereof that cooperate to provide multi-protocol access control through a generalized initiator addressing technique.

Advantageously, the inventive technique obviates the need to use a WWN or iSCSI name ID during operation of the multi-protocol storage appliance except in a command used to bind the ID to an igroup. All other operations and commands invoked via, e.g., a user interface use only the igroup. This is a powerful and consistent abstraction with fundamental implications on global updates, e.g., when replacing an initiator in a client and the need to globally replace a WWN or iSCSI name, and in achieving goals of simplicity to create the multi-protocol storage appliance.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for enabling efficient access to a virtual disk (vdisk) stored on a storage system, the method comprising:
   grouping initiators by a selectable name entered through an interface, where the initiators are clients that initiate a request for the vdisk using a block-based access protocol;
   mapping the selectable name to the vdisk; and
   enabling access to the vdisk using the selectable name by all initiators of the grouping.

2. The method of claim 1 wherein the step of grouping comprises:
   issuing an initiator group (igroup) create command through the interface of the storage system, the igroup create command specifying the selectable name and one or more addresses of initiators bound to the name;
   creating an igroup data structure in a memory of the storage system, where the igroup is a logical named entity that is assigned to the one or more addresses associated with the one or more initiators; and
   inserting the name and initiator addresses specified by the igroup create command into the igroup data structure.

3. The method of claim 2 wherein the step of mapping comprises:
   issuing a lun map command through the interface, the lunmap command specifying export information for the vdisk;
   loading a lunmap inode of the vdisk into the memory; and
   populating the lunmap inode with the export information specified by the lun map command.

4. The method of claim 3 wherein the export information comprises the name and a lun identifier (ID) assigned to the vdisk, and wherein the step of enabling comprises the step of priming a small computer systems interface module of the storage system with the name and lun ID.

5. The method of claim 4 wherein the step of priming comprises resolving the name associated with the lun ID to the initiator addresses stored in the igroup data structure.

6. The method of claim 1, wherein the interface is an administrative interface.

7. The method of claim 1, wherein the selectable name is an arbitrary label selected by a user.

8. A storage operating system configured to enable efficient access to a virtual disk (vdisk) stored on a storage device of a storage system, the storage operating system comprising:
   a user interface adapted to receive commands that create an initiator group (igroup) of initiators and map the vdisk to the igroup, the commands specifying a user selected igroup name, addresses of the initiators and a logical unit number (lun) identifier (ID) assigned to the vdisk;
   a file system configured to provide volume management capabilities for use in block-based access to the vdisk stored on the storage device;
   a vdisk module that cooperates with the file system to bind the user selected igroup name to the initiator addresses; and
   a small computer systems interface (SCSI) target module that cooperates with the vdisk module to map the user selected igroup name to the vdisk, the SCSI target module implementing a mapping function that allows the vdisk to be exported to the initiators of the igroup.

9. The storage operating system of claim 8 wherein storage system is a multiprotocol storage appliance and wherein the initiators are clients of the storage appliance operating in a storage area network (SAN) environment to initiate requests for the vdisk using block-based access protocols.

10. The storage operating system of claim 9 wherein the block-based access protocols comprise a SCSI protocol encapsulated over TCP/IP (iSCSI) or over fibre channel (FCP).

11. The storage operating system of claim 10 wherein an igroup is a logical named entity that is assigned to one or more addresses associated with one or more initiators.

12. The storage operating system of claim 11 wherein the addresses comprise FC world wide name (WWN) or iSCSI name IDs.

13. The storage operating system of claim 11 wherein the igroup comprises a multi-protocol encapsulation of host access control and address information making the vdisk specifically transport protocol independent.

14. The storage operating system of claim 8 wherein the file system further retrieves a lun inode and associated streaminodes of the vdisk from the storage device and loads the inodes into a memory of the storage system.

15. The storage operating system of claim 14 wherein one of the associated streaminodes of the vdisk embodies a lunmap inode that includes a data section functioning as a persistent store for holding a list of name-value pairs.

16. The storage operating system of claim 15 wherein each name-value pair stored in the lunmap inode comprises the igroup name and lun ID.

17. The storage operating system of claim 8 wherein the vdisk module cooperates with the file system to create an igroup data structure in a memory of the storage system, the vdisk module calling primitive operations in the file system to insert the user selected igroup name and initiator addresses into the igroup data structure.

18. Apparatus for enabling efficient access to a virtual disk (vdisk) stored on a storage system, the apparatus comprising:
    means for grouping initiators by an initiator group (igroup) name, where the initiators are clients that initiate a request for the vdisk using a block-based access protocol;
    means for mapping the igroup name to the vdisk; and
    means for enabling access to the vdisk using the igroup name by all initiators of the grouping.

19. The apparatus of claim 18 wherein the means for grouping comprises:
    means for issuing an igroup create command to the storage system, the igroup create command specifying the igroup name and one or more addresses of initiators bound to the igroup name;
    means for creating an igroup data structure in a memory of the storage system; and
    means for inserting the igroup name and initiator addresses specified by the igroup create command into the igroup data structure.

20. The apparatus of claim 19 wherein the means for mapping comprises:
    means for issuing a lun map command to the storage system, the lunmap command specifying export information for the vdisk;
    means for loading a lunmap inode of the vdisk into the memory; and
    means for populating the lunmap inode with the export information specified by the lun map command.

21. A computer readable medium containing executable program instructions for enabling efficient access to a virtual disk (vdisk) stored on a storage system, the executable program instructions comprising program instructions for:
    grouping initiators by an initiator group (igroup) name, where the initiators are clients that initiate a request for the vdisk using a block-based access protocol;
    mapping the igroup name to the vdisk; and
    enabling access to the vdisk using the igroup name by all initiators of the grouping.

22. The computer readable medium of claim 21 wherein the instruction for grouping comprises program instructions for:
    issuing an igroup create command through an administrative interface of the storage system, the igroup create command specifying an igroup name and one or more addresses of initiators bound to the igroup name;
    creating an igroup data structure in a memory of the storage system; and
    inserting the igroup name and initiator addresses specified by the igroup create command into the igroup data structure.

23. The computer readable medium of claim 22 wherein the instruction for mapping comprises program instructions for:
    issuing a lun map command through the administrative interface, the lunmap command specifying export information for the vdisk;
    loading a lunmap inode of the vdisk into the memory; and
    populating the lunmap inode with the export information specified by the lun map command.

24. The computer readable medium of claim 23 wherein the export information comprises the igroup name and lun identifier (ID) assigned to the vdisk, and wherein the instruction for enabling comprises program instructions for resolving the igroup name associated with the lun ID to the initiator addresses stored in the igroup data structure.

25. A method for faster access to a virtual disk (vdisk) stored on a storage system, the method comprising:
    grouping one or more clients into an initiator group (igroup) entered through an interface, where the one or more clients initiate a request for the vdisk using a blockbased access protocol;
    selecting a selectable name for the igroup, where the igroup is a logical named entity that is assigned to one or more addresses associated with the one or more clients; and
    mapping the vdisk to the user selected name for the igroup to allow the one or more clients to access the vdisk using the selectable name.

26. The method of claim 25, further comprising:
    issuing an igroup create command, the igroup create command specifying the user selected name and the one or more addresses of clients bound to the name;
    creating an igroup data structure in a memory of the storage system; and
    inserting the user selected name and client addresses specified by the igroup create command into the igroup data structure.

27. The method of claim 25, further comprising
    issuing a lun map command, the lunmap command specifying export information for the vdisk;
    loading a lunmap inode of the vdisk into a memory of the storage system; and
    populating the lunmap inode with the export information specified by the lun map command.

28. The method of claim 25, further comprising:
    implementing a mapping function that allows the vdisk to be exported to the one or more clients of the igroup by a small computer systems interface (SCSI) target module.

29. An apparatus for faster access to a virtual disk (vdisk) stored on a storage system, comprising:
    means for grouping one or more clients into an initiator group (igroup), where the one or more clients initiate a request for the vdisk using a block-based access protocol;
    means for selecting a selectable name for the igroup, where the igroup is a logical named entity that is assigned to one or more addresses associated with the one or more clients; and
    means for mapping the vdisk to the user selected name for the igroup to allow the one or more clients to access the vdisk using the selectable name.

30. The apparatus of claim 29, further comprising:
    means for issuing an igroup create command, the igroup create command specifying the user selected name and the one or more addresses of clients bound to the name;
    means for creating an igroup data structure in a memory of the storage system; and
    means for inserting the user selected name and client addresses specified by the igroup create command into the igroup data structure.

31. The apparatus of claim 29, further comprising
    means for issuing a lun map command, the lunmap command specifying export information for the vdisk;
    means for loading a lunmap inode of the vdisk into a memory of the storage sytstem; and
    means for populating the lunmap inode with the export information specified by the lun map command.

32. The apparatus of claim 29, further comprising:

means for implementing a mapping function that allows the vdisk to be exported to the one or more clients of the igroup by a small computer systems interface (SCSI) target module.

33. A storage operating system configured to enable faster access to a virtual disk (vdisk) stored on a storage device, comprising:

a user interface adapted to receive commands that create an initiator group (igroup) of one or more clients, and to select a selectable name for the igroup, where the igroup is a logical named entity that is assigned to one or more addresses associated with the one or more clients; and a vdisk module to bind the vdisk to the selectable name for the igroup to allow access to the one or more clients of the igroup using the user selected name.

34. The system of claim 33, further comprising:

a small computer systems interface (SCSI) target module that cooperates with the vdisk module to map the selectable name for the igroup to the vdisk, the SCSI target module implements a mapping function that allows the vdisk to be exported to the one or more clients of the igroup.

35. An improved method for access to a virtual disk (vdisk) stored on a storage system, the method comprising:

receiving a block-based access protocol first request from one or more clients with the first request including one or more addresses to the vdisk;

grouping, in response to the first request, the one or more clients by a user selected name to form a group;

binding the one or more addresses to the group with the user selected name;

mapping the group with the user selected name to the vdisk; and receiving, from a client of the group, a second request using the user selected name to access the vdisk.

36. The method of claim 35, wherein the one or more addresses is at least one of a fibre channel world wide name and an iSCSI name identifier.

37. The method of claim 35, wherein the step of grouping comprises the steps of:

issuing a group create command through an administrative interface of the storage system, the group create command specifying the user selected name and one or more addresses of clients bound to the name;

creating a group data structure in a memory of the storage system; and inserting the name and the one or more addresses specified by the group create command into the group data structure.

38. The method of claim 35, wherein the step of mapping comprises the steps of:

issuing a lunmap command through an administrative interface, the lunmap command specifying export information for the vdisk;

loading a lunmap inode of the vdisk into the memory; and populating the lunmap inode with the export information specified by the lunmap command.

* * * * *